Sept 8, 1925.
A. GRAUEL
1,552,555
GLASS REFINING FURNACE
Filed Jan. 20, 1923
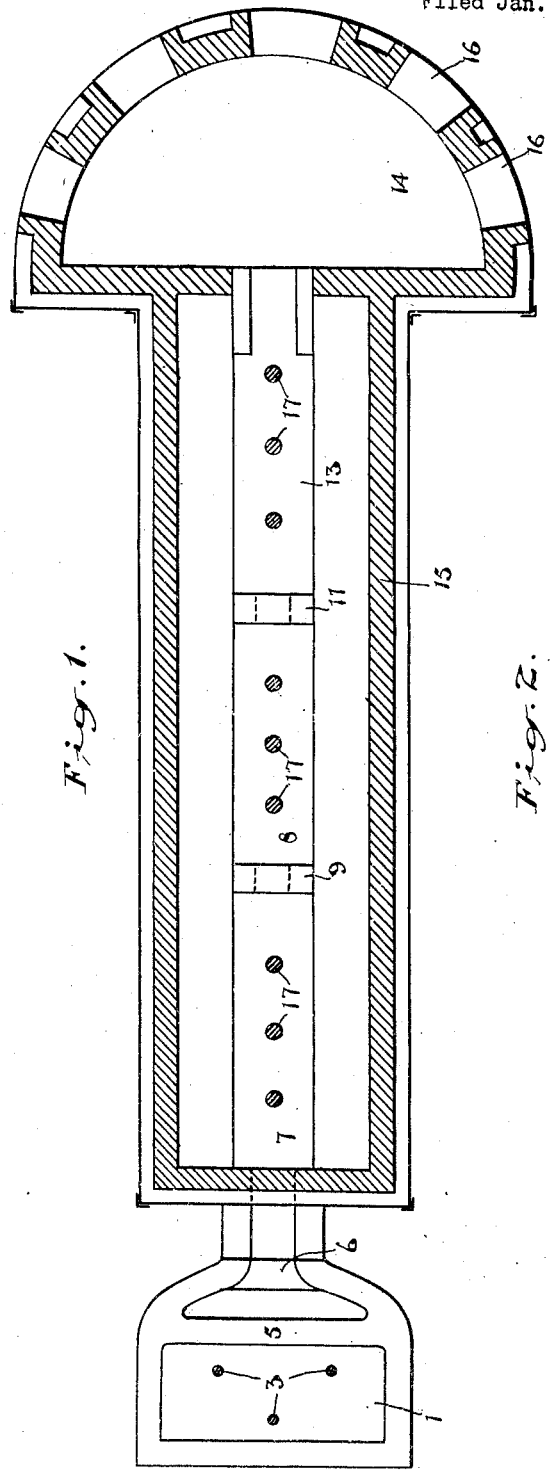
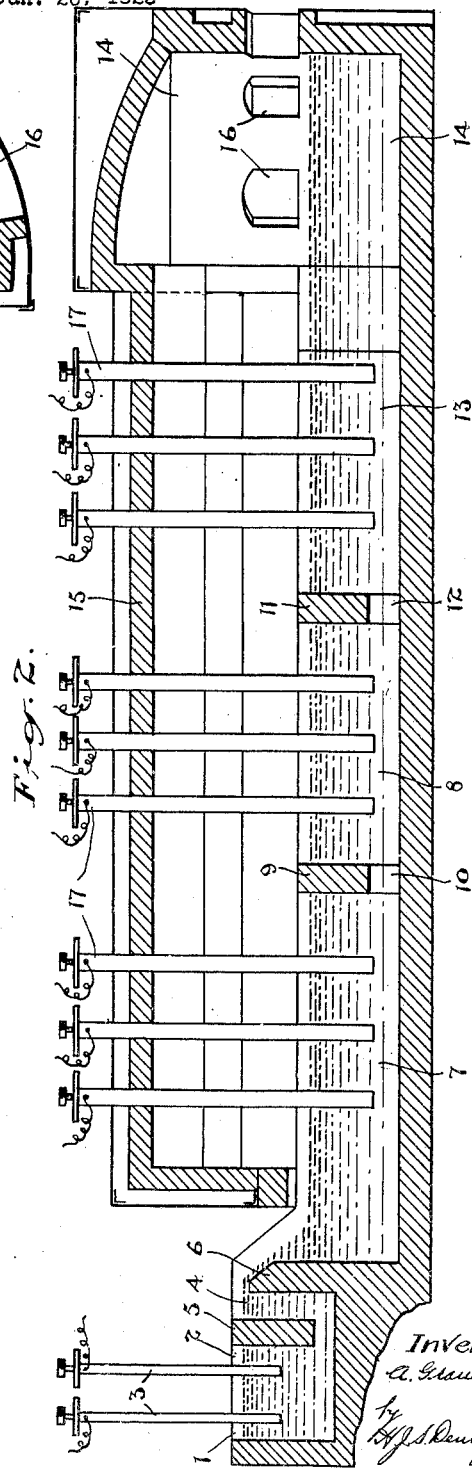
Inventor
A. Grauel
by H. J. S. Dennison
Atty.

Patented Sept. 8, 1925.

1,552,555

UNITED STATES PATENT OFFICE.

ALLAN GRAUEL, OF OSHAWA, ONTARIO, CANADA, ASSIGNOR OF ONE-TENTH TO FREDERICK CHARLES HOAR, OF BOWMANVILLE, ONTARIO, CANADA.

GLASS-REFINING FURNACE.

Application filed January 20, 1923. Serial No. 613,982.

*To all whom it may concern:*

Be it known that I, ALLAN GRAUEL, a subject of the King of Great Britain, and resident of the town of Oshawa, county of Ontario, Province of Ontario, in the Dominion of Canada, have invented certain new and useful Improvements in Glass-Refining Furnaces, described in the following specification and illustrated in the accompanying drawings, that form part of the same.

The objects of this invention are to obtain a superior quality of glass and to produce same at a minimum cost, and further to devise a furnace of simple and efficient construction which may be manipulated with the minimum amount of attention.

The principal feature of the invention consists in the novel arrangement of a plurality of chambers for holding the glass and the provision of separately controlled heating units in each of said chambers.

In the drawings, Figure 1 is a plan sectional view of a furnace constructed in accordance with this invention.

Figure 2 is a longitudinal vertical midsection.

In the construction herein shown the melting pot 1 is arranged at one end of the refining furnace and is provided with a wall 2 in which the glass is melted by the electrodes 3. The molten glass rises in a float chamber 4 arranged at one side of the partition wall 5 and it flows over the confining wall 6 into the chamber 7 extending into the furnace proper.

The adjoining chamber 8 is separated from the chamber 7 by a transverse wall 9 which is provided with an opening 10 in the bottom.

A transverse wall 11 having an opening 12 in the bottom separates the chamber 8 from the chamber 13, which chamber extends into the work chamber 14. The chambers 7, 8 and 13 are covered in by a dome wall construction 15. The work chamber is preferably of semi-circular formation and the wall thereof is provided with work openings 16.

Electrodes 17 are arranged in groups in the chambers 7, 8 and 13 respectively. These extend down through the dome cover 15 close to the bottom of the glass chambers and a heat is developed which maintains the glass in the particular chambers at the desired temperature.

The glass is first melted in the melting pot 1, which may be constantly replenished according to the amount of glass being used, and as it flows into the chamber 7 it becomes subjected to the heat of the electrodes 17, which is maintained at a very high temperature. The further flow of the glass carries it into the chambers 8 and 13 respectively and successively and in each of these chambers it is subjected to a different temperature by the application of the required electrical current to the electrodes.

By this process the glass is thoroughly refined and brought to the most desirable condition for moulding and the glass in the work chamber is maintained at a uniform heat.

What I claim as my invention is:

1. A glass refining furnace having a melting chamber at one end and a work chamber at the other end, a plurality of intermediate chambers between said melting chamber and said work chamber, and heating electrodes arranged in each of said intermediate chambers.

2. In a glass refining furnace, having a unitary melting pot divided by a partition to form heating and float chambers, an outer structure having a plurality of transverse partitions dividing the interior into a plurality of narrow chambers, each of said partitions having openings through the bottom, said float chamber being arranged to overflow into one of the chambers and heating electrodes extending through the top of the furnace into each of said chambers and adapted to maintain independent temperatures in the different chambers.

3. A glass refining furnace formed integral with a melting pot, comprising, a furnace structure having a closed top and a work chamber at one end and an opening at the opposite end, said melting pot being formed with heating and float chambers, heating electrodes entering said heating chamber from the top, said float chamber being arranged to discharge into the opening, a plurality of transverse partitions within the furnace dividing the interior into a plurality of narrow chambers, said partitions having openings through the bottoms, and electrodes arranged in each of said chambers and adapted to independently maintain the desired temperatures within the several chambers.

ALLAN GRAUEL.